July 4, 1939.  V. CARPENTIERI  2,164,384
TOMATO AND FRUIT PEELING MACHINE
Filed Sept. 16, 1936  2 Sheets-Sheet 1
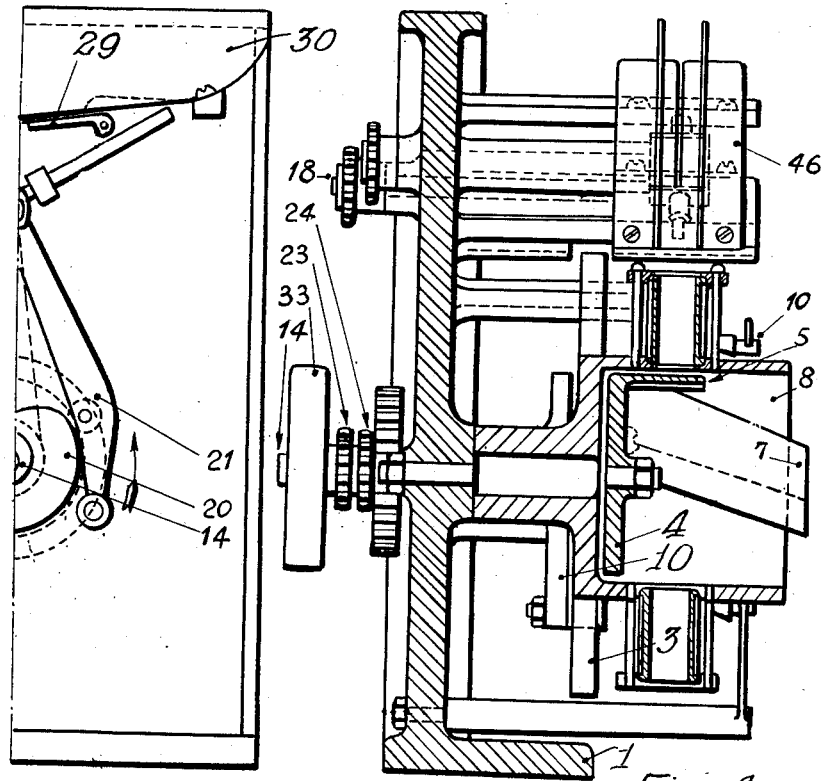
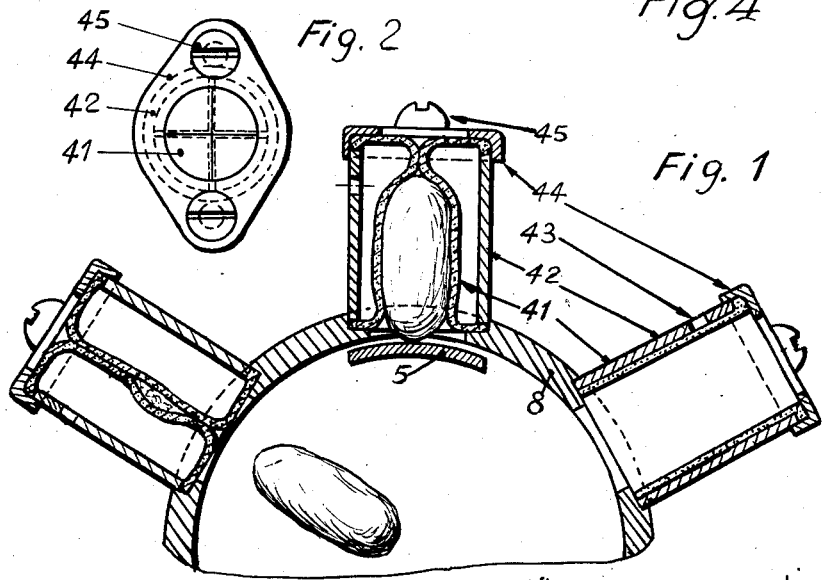
Vincenzo Carpentieri
INVENTOR
his ATTY.

July 4, 1939.    V. CARPENTIERI    2,164,384
TOMATO AND FRUIT PEELING MACHINE
Filed Sept. 16, 1936    2 Sheets-Sheet 2
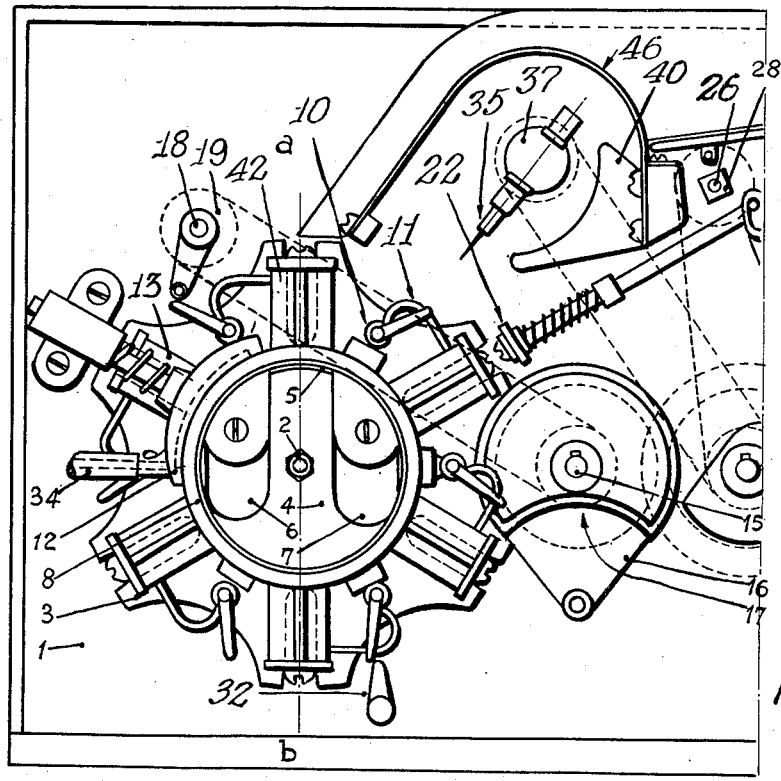
Fig. 3
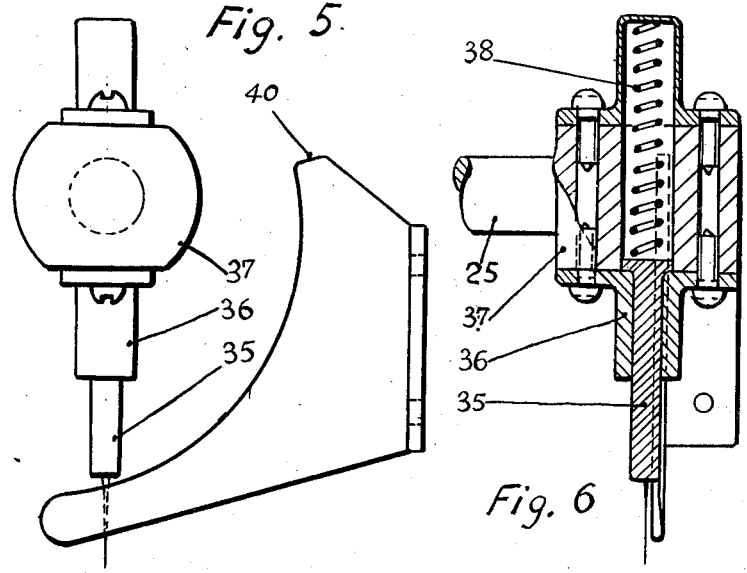
Fig. 5.
Fig. 6
Vincenzo Carpentieri
INVENTOR
By [signature]
his ATTY.

UNITED STATES PATENT OFFICE 2,164,384

TOMATO AND FRUIT PEELING MACHINE

Vincenzo Carpentieri, Turin, Italy

Application September 16, 1936, Serial No. 101,027
In Italy September 20, 1935

6 Claims. (Cl. 146—48)

The present invention relates to a machine removing the skin of certain fruits and vegetables and more particularly tomatoes. Machines of this kind are known, wherein the tomato is forced into an elastic tube, usually made of rubber, which by friction of the walls against the fruit removes and carry away its peelings.

However such methods have caused inconveniences and they compel to a pre-selection of fruit, as there is evidently a relation between fruit diameter and tube caliper, in default whereof the larger fruits are crushed and ruined by the tube, whilst the smaller ones pass through it without peeling. Even the circumstance that tube elasticity varies in the long run because of rubber deterioration negatively influences the advantages of the method.

According to the present invention these inconveniences are done away with and fruit of any size, within normal limits, can be peeled, the peeling device consisting of a flexible tube or sleeve which automatically fits to shape and size of the fruit to be peeled, being enclosed in rigid sleeve, while provision is made for the admission of a fluid under pressure in the interstice between the flexible and the rigid sleeve.

The invention is completed by means of automatic supply of the fruit, others for removal of the peelings and by sundry accessorial improvements which permit of realizing a high production rationally operating machine to the end specified.

The annexed drawings show the machine being the object of the invention:

Fig. 1 is a detail of the peeling cylinder.

Fig. 2 is a plan thereof.

Fig. 3 is a front view of an instance of the machine according to the invention.

Fig. 3a is an extreme right portion of the front view of the machine.

Fig. 4 is a sectional view on line a—b of Fig. 3.

Figs. 5 and 6 are details of the supplying device.

42 designates a rigid cylinder, within which a sleeve 41 of flexible or elastic material is disposed; cylinder and sleeve being hermetically connected at their extremities, whereby an interstice results which communicates with the outside through an opening 43. Cylinder 42 is completed above by a flange 44 fixed by means of screws 45.

One or more such cylinders are mounted on a rotary drum 8 within which a fixed bridge 5 is disposed, which closes successively the cylinders 42 as soon as these, by rotation of drum 8, come in correspondence with it.

The working of such device is as follows:

One fruit is introduced into and up to the bottom of the cylinder 42 whilst lying on bridge 5, whereupon a fluid under pressure (which may be a liquid or a gas) is caused to enter the interstice through the opening 43 connected with a suitable conduit.

The interstice swells and the flexible sleeve closely adheres against and on the fruit to force it out downwards, hereto resisted by bridge 5.

But as soon as cylinder 42, by rotation of the drum, is outside the bridge, the fruit is extruded, but its skin is retained by sleeve 41. In order to facilitate this separation of skin it is useful (but not necessary to remove a little portion of said skin near the lower pole of the fruit. To this end the bridge 5 may be provided with a cutting plate, an abrasive material, etc.

The above described apparatus can already be regarded as a useful fruit peeling machine, which even may be reduced to consist of the cylinder and sleeve 41—42 with bridge 5, oscillating in relation to each other, and completed by a conduit of fluid under pressure with the necessary cock equipment. But for high industrial production automatic fruit feeding and automatic working of the whole process is to be provided for.

The machine fit for this purpose is shown in Figures 3 to 6 of the annexed drawings, wherein: I indicates a body carrying a fixed shaft 2, whereon rotates a Maltese-cross-like wheel rigid with drum 8 which carries the cylinders 42. Fixed shaft 2 carries a disc keyed on it, wherewith bridge 5 and collecting channels 6 and 7 are rigidly connected.

The Maltese-cross-like wheel carries, besides cylinders 42, cocks 10 connected with openings 43 of the cylinders through tubes 11. A means for drawing in air or other fluid under pressure is disposed at 12 fixedly on the body and pressed by spring 13 resiliently against drum 8, which thereby works as a rotary distributor supplied with liquid from a tube 34 and delivering the same to the cocks 10. A shaft 14 with a toothed wheel controls shaft 15 carrying the lever 16 actuating the Maltese cross. A pinion 17 transmits the inverted motion, through a chain, to shaft 18 controlling cocks 10, through crank 19.

A cam 20, keyed on shaft 14, actuates lever 21 controlling in turn brush 22.

Pinions 23 and 24, also keyed on shaft 14, actuate shafts 25 and 26 controlling, respectively, a needle feeding arrangement and a fourfold cam. The latter holds in vibration an inclined plane 29, which conveys the fruit from a funnel 30 to the needle feeder 37. The latter comprises a needle 35 fit to slide in a bearing 36 fixed on body 37 rigid with shaft 25. A spring 38 pushes needle 35 to the outside which is however driven inwards, during the rotation of shaft 25, by fixed cam 40 when charging the spring. As soon as, during the rotation, the cam is overstepped, the needle is driven outwards and it pierces the fruit appearing on the inclined plane 29 carrying it away and dropping it along the inclined plane 46' and thence in cylinder 42 along the axis a—b.

The working of the machine is as follows:

By causing pulley 33 to rotate, it will keep drum 8 in intermittent motion through the Maltese cross wheel. Meanwhile the tomatoes arriving from the boiler and loaded on funnel 30 proceed on plane 29 up to and against wall 46, apertured for the passage of needle 45 which, as above stated, carries the fruits into cylinder 42, 42, where it lies on bridge 5. In this instant crank 19 opens cock 10 and the fluid under pressure flows in the interstice. As soon as the rotation of the drum brings cylinder 42 beyond the bridge, the fruit is driven back and peeled as said before. Continuing the rotation, the cylinder discharges the fluid under pressure and the sleeve 41 re-assumes its form. When the cylinder comes in correspondence with brush 22, the latter is driven in its interior and carries away the adhering peelings discharging them in channel 7.

Since the cocks were shut when passing in correspondence with fixed lever 32, the cylinder that has performed the cycle is ready for beginning a new one. Of course the number of cylinders, wherewith the machine is provided, may be any one. The other details may likewise be varied within ample limits to answer all practical requirements.

I claim:

1. A machine for removing the skins of certain fruits and vegetables especially tomatoes, comprising an intermittently rotated drum, radially disposed individual skin removing devices arranged peripherally of the drum, each device comprising a rigid cylindrical casing an elastic sleeve disposed within the casing and attached at its opposite ends to the ends of the latter to form a jacket for receiving liquid under pressure, a central passage being formed by said sleeve to receive the fruit or vegetable at one end and to deliver the same skinned at the other end of the latter, means to feed the fruit or vegetable into the passage of the sleeve, fixed means in the receiving position of the sleeve to prevent ejection of the fruit or vegetable from the delivery end of the sleeve, means to flow liquid under pressure into the jacket after receiving the fruit or vegetable in order to cause the sleeve to close in over the outer end and against the sides of the fruit or vegetable, and means in one position of the drum after delivering the skinned fruit or vegetable to enter the passage in the sleeve to remove the skin therefrom.

2. A machine, as claimed in claim 1, including further means actuated in connection with the intermittently rotated drum to introduce the fruit or vegetable into the receiving end of the sleeve.

3. A machine, as claimed in claim 1, comprising feeding means for introducing the fruit or vegetable into the receiving end of the sleeve, said feeding means including a movable needle, a spring controlling said needle, and a fixed cam adapted to tension said spring during part of the needle's movement and to release it and project the needle, when the latter is opposite the fruit or vegetable to be pierced and carried towards the skinning cylinder.

4. A device for removing the skin of certain fruits and vegetables, particularly tomatoes, comprising an elastic sleeve, a rigid cylindrical casing, open at both ends, encircling said sleeve and coincident at its opposite ends with the ends of the sleeve, said sleeve having airtight connections securing its opposite ends with the opposite ends of the casing, means for positioning a fruit in said sleeve with one end of the fruit adjacent the lower end of the sleeve, the upper portion of the sleeve being arranged to form a closure at the top thereof when fluid under pressure is supplied between the casing and the sleeve so as to cause the sleeve to close over the upper end and the sides of the fruit or vegetable present, the bottom end of the sleeve being open, means for supplying fluid under pressure between the casing and sleeve, the pressure at the top and sides of the sleeve acting to cause the sleeve to adhere closely to the skin of the fruit or vegetable present and tending to extrude the fruit or vegetable present from its skin and sleeve, and means to bar the extrusion of the fruit or vegetable from its skin until the pressure on the sleeve causes the latter to adhere firmly to the skin.

5. A skin removing device, as claimed in claim 4, including an intermittent rotary drum carrying said sleeve and casing and at one pause in its rotary movement the delivery end of the sleeve being disposed over said last named means to bar ejection of the fruit or vegetable from the sleeve.

6. A skin removing device, as claimed in claim 4, including an intermittent rotary drum carrying said sleeve and casing and at one pause in its rotary movement the delivery end of the sleeve being disposed over said last named means to bar ejection of the fruit or vegetable from the sleeve, said means comprising a fixed arcuate plate provided with means to engage the fruit or vegetable, thereby causing an initial break in the skin thereof.

VINCENZO CARPENTIERI.